US00RE43064E

(19) United States
(12) Reissued Patent
Lee

(10) Patent Number: US RE43,064 E
(45) Date of Reissued Patent: Jan. 3, 2012

(54) METHOD FOR DOWNLOADING INFORMATION DATA IN WIRELESS LOCAL LOOP SYSTEM

(75) Inventor: Seok Su Lee, Seoul (KR)

(73) Assignee: LG Electronics Inc., Seoul (KR)

(21) Appl. No.: 12/646,391

(22) Filed: Dec. 23, 2009

Related U.S. Patent Documents

Reissue of:
(64) Patent No.: 7,336,946
Issued: Feb. 26, 2008
Appl. No.: 10/017,590
PCT Filed: Dec. 18, 2001

(30) Foreign Application Priority Data

Dec. 23, 2000 (KR) ..... 2000-81348

(51) Int. Cl.
*H04M 3/00* (2006.01)

(52) U.S. Cl. ..... 455/419; 455/414.4; 455/67.11; 455/426.2

(58) Field of Classification Search ..... 455/418, 455/419, 412.1, 566, 558; 370/7.41, 313
See application file for complete search history.

(56) References Cited

U.S. PATENT DOCUMENTS 5,210,751 A 5/1993 Onoe et al. ..... 370/349
5,297,192 A * 3/1994 Gerszberg ..... 455/419
5,301,232 A * 4/1994 Mulford ..... 380/273
5,343,494 A * 8/1994 Averst et al. ..... 370/313
5,381,138 A * 1/1995 Stair et al. ..... 340/7.41
5,418,837 A * 5/1995 Johansson et al. ..... 455/558
5,479,476 A * 12/1995 Finke-Anlauff ..... 455/566
5,544,223 A 8/1996 Robbins et al. ..... 455/426.2
5,577,103 A * 11/1996 Foti ..... 455/412.1
5,654,901 A 8/1997 Boman ..... 717/173
5,794,142 A * 8/1998 Vanttila et al. ..... 455/419
5,842,124 A * 11/1998 Kenagy et al. ..... 455/418
6,023,620 A 2/2000 Hansson ..... 455/419
6,029,065 A 2/2000 Shah ..... 455/414.4
6,041,124 A 3/2000 Sugita ..... 380/270
6,434,364 B1 8/2002 O'Riordain ..... 455/67.11
6,587,684 B1 7/2003 Hsu et al. ..... 455/419

FOREIGN PATENT DOCUMENTS

WO WO 98/38820 9/1998

* cited by examiner

*Primary Examiner* — David Q Nguyen
(74) *Attorney, Agent, or Firm* — KED & Associates, LLP

(57) ABSTRACT

A method for downloading information to mobile communication terminals utilizes a paging channel. The method includes demanding, at a base station, a download operation to multiple mobile stations, simultaneously downloading information from the base station to the multiple mobile stations through a paging channel, storing the downloaded information in the multiple mobile stations, and resetting the mobile station system using the stored data. Thereafter, a downloading result is reported to the base station.

30 Claims, 5 Drawing Sheets

METHOD FOR DOWNLOADING INFORMATION DATA IN WIRELESS LOCAL LOOP SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a method and apparatus for downloading information from a wireless local loop (WLL) system to terminals and, in particular, to a method for downloading information to a plurality of terminals using a paging channel.

2. Background of the Related Art

In general, a mobile communication system implies a communication system to moving objects, such as human beings, automobiles, trains, and airplanes. Exemplary mobile communication systems include key phone systems, mobile phones (cellular phones and car phones), harbor phones, airplane phones, mobile pay phones (installed in trains, excursion ships and express buses), wireless pagers, wireless phones, satellite mobile communication systems, amateur wireless systems, and fishery wireless systems. In addition, the WLL serves subscriber lines connecting a telephone office to subscriber terminals using a wireless system, instead of using wired lines.

In the WLL, the terminal includes an externally-accessible serial port. The terminal, connected to a control device through the serial port, monitors an operation state of internal software, detects internally-stored data, and downloads a new software version for upgrading. A related downloading method in a mobile communication system will now be explained.

FIGS. 1 and 2 show the related method for downloading information from the mobile communication system to the mobile communication terminals. FIG. 1 is a block diagram illustrating an apparatus for downloading information to the terminals and FIG. 2 is a flowchart showing the related method for downloading information to the terminals.

Referring to FIG. 1, in order to download information to the terminal, the communication system includes a terminal 10, having a built-in serial port 11, and a base station subsystem 40 that communicates to the terminal 10 through a wireless section. The base station subsystem 40 includes a base station 20 and a base station controller 30 for managing the base station 20. In addition, the communication system includes a control device 12 connected to the serial port 11 of the terminal 10, for controlling the terminal 10, and a control device 22 connected to the base station 20, for controlling the base station 20.

The related method for controlling the terminal (mingled with a mobile station) and the base station or upgrading software in the mobile communication system will now be described with reference to FIG. 2. To upgrade the software stored in the terminal 10, the terminal 10 drives a communication program and confirms a normal operation of the serial port 11. The serial port 11 of the terminal 10 is connected to the control device 12 through a cable (ST1 and ST2). If the serial port 11 is operating normally, the terminal 10 confirms whether an upgrade switch of the terminal 10 is pressed or not (ST3). If the upgrade switch of the terminal 10 is pressed, the terminal drives a boot program and determines a downloading area (ST 4 and ST5).

If the downloading area is determined, an execute file is downloaded to the terminal 10 by a downloading command and the downloaded execute file is stored in a memory of the terminal 10 (ST6 and ST7). After the downloading process is finished, the stored execute file is driven by a start command of the user (ST8). That is, the control device is connected directly to the serial port to control the terminal or upgrade the program, in the related art. On the other hand, the related downloading method can be implemented through a signal channel. In the signal channel, a call is set up in a call setup procedure and the base station and the terminals are connected one to one (1:1), thereby reducing a downloading speed. Accordingly, the related method for downloading information data to the mobile communication terminal has a disadvantage in that terminal subscribers should move to a downloading area to download information data. To upgrade software of the widely-distributed terminals requires considerable time and expense. Moreover, the downloading speed is decreased.

SUMMARY OF THE INVENTION

An object of the invention is to solve at least the above problems and/or disadvantages and to provide at least the advantages described hereinafter.

It is another object of the present invention to provide a method for downloading information data to mobile communication terminals through a paging channel.

It is a further object of the invention to provide a method that can efficiently control the widely-distributed terminals.

It is a further object of the invention to reduce the time and expense of downloading information by simultaneously transmitting the upgrade information from a mobile communication system to the terminals through the paging channel.

To achieve the above objects, there is provided a method for downloading information to mobile communication terminals through a paging channel. The method includes demanding, at a base station, a download operation to a mobile station; simultaneously downloading the information and storing it in a plurality of mobile stations through the paging channel; and resetting the mobile station system using the stored data and reporting a downloading result to the base station side.

According to one aspect of the present invention, the mobile communication system downloads the information data to the plurality of mobile communication terminals through the paging channel, thereby efficiently controlling the widely-distributed terminals.

In addition, software of the terminals can be easily replaced and expenses and time for maintenance/repair can be remarkably reduced.

The objects of the invention may be further achieved in whole or in part by a method of communicating information, including sequentially communicating data messages from a common terminal to distributed terminals, storing the data messages in each of the distributed terminals, and resetting an operational mode of the distributed terminals based on the stored data messages. The common terminal communicates each of the data messages to all of the distributed terminals simultaneously through a shared communication channel.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
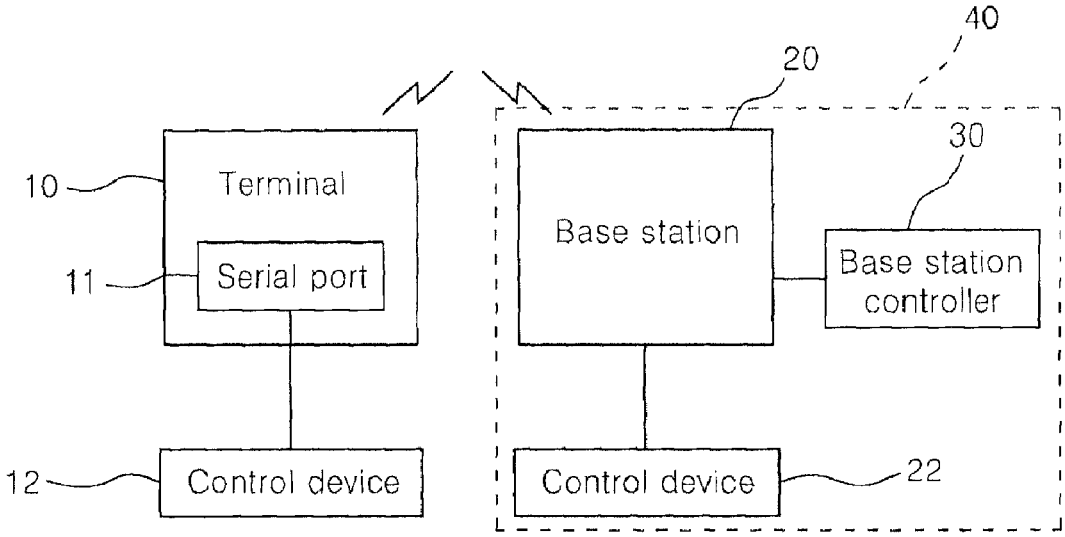
FIG. 1 (Related Art)
FIG. 1 illustrates a block diagram of a related apparatus for downloading information data to a mobile communication terminal (mobile station)
Figure 2:
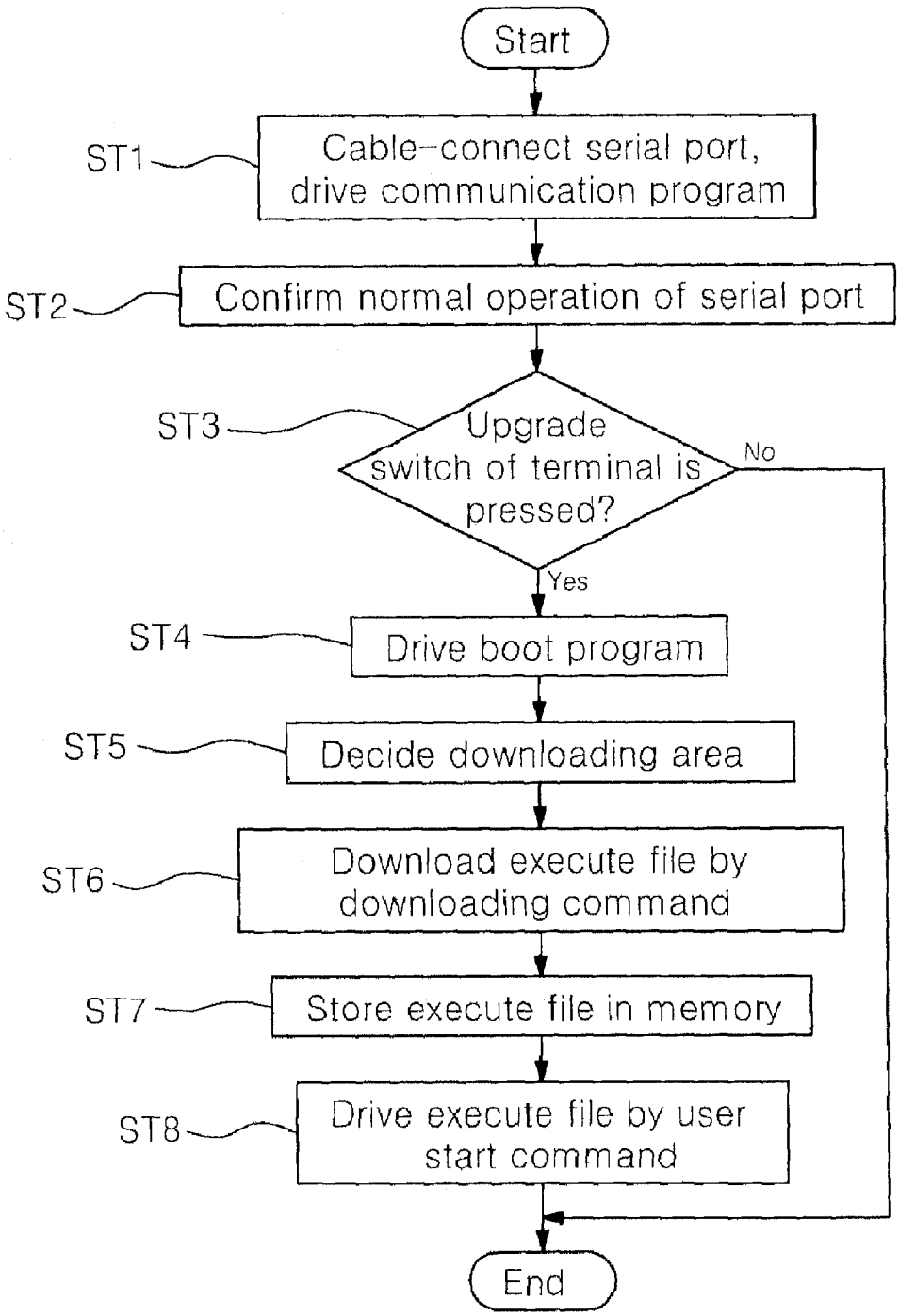
FIG. 2 (Related Art)
FIG. 2 illustrates a flowchart showing sequential steps of a related method for downloading information to the mobile communication terminal.
Figure 3:
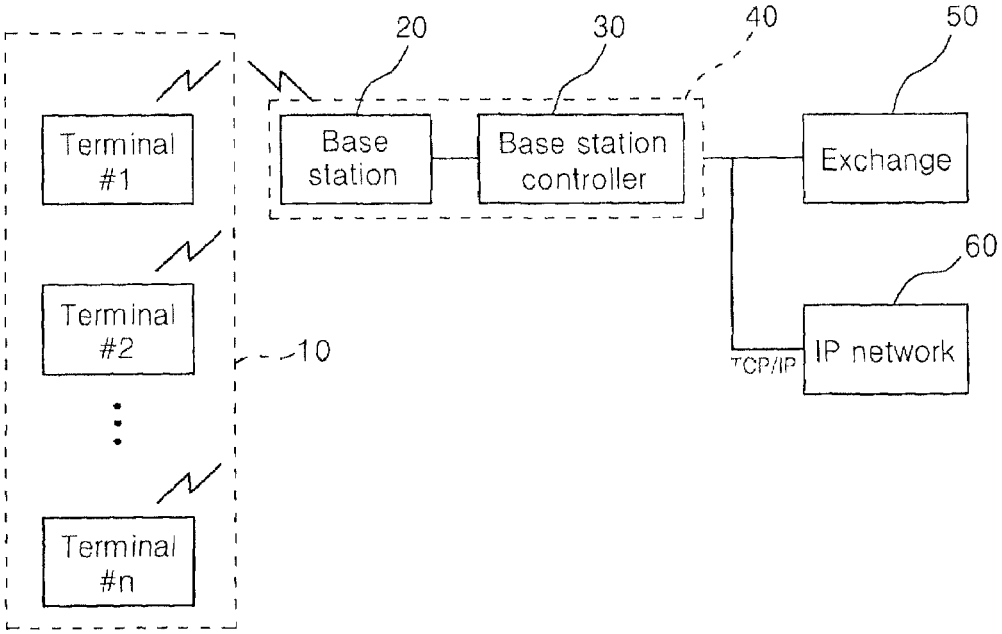
FIG. 3 illustrates a block diagram of the WLL system of a mobile communication system in accordance with a preferred embodiment of the present invention.

FIG. 3 is a block diagram illustrating the WLL system of a mobile communication system in accordance with the preferred embodiment of the present invention. The WLL system includes a plurality of terminals 10; a base station 20 communicating to the plurality of terminals 10 through a wireless section; a base station controller 30 for managing the base station 20; and an exchanging station 50 and an IP network 60 connected to the base station controller 30. The combination of the base station 20 and the base station controller 30 is called a base station subsystem 40. The operation of the WLL system of FIG. 3 will now be explained at length.

When a mobile communication subscriber hooks off the terminal 10 in a standby mode, the terminal 10 sends a resource allocation demand to the base station 20 through an access channel. The base station 20 performs the resource allocation according to the request of the terminal 10. The base station 20 also demands a call setup to the exchanging station 50 through the base station controller 30.

The terminal 10 receives a resource allocation message, activates a physical layer, and transmits/receives signal information to/from the base station 20 through the signal channel. But, if the subscriber hooks on the terminal 10, the terminal 10 transmits a cancellation message through the signal channel and inactivates the physical channel.

In the case of terminating the call, the base station 20 transmits a reception signal to the terminal 10 through the paging channel. If the terminal 10 receives a reception signal request, the terminal 10 transmits a call request message to the base station 20.

Figure 4:
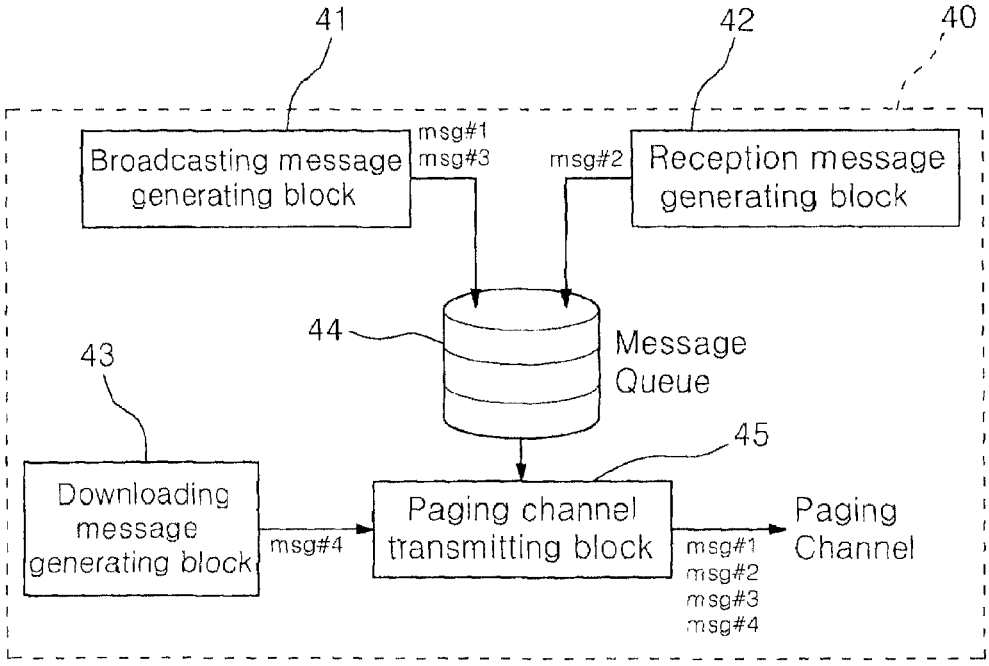
FIG. 4 illustrates a block diagram of a message queue method for transmitting a downloading message to a terminal through a paging channel.

FIG. 4 is a block diagram of a state where the base station subsystem 40 transmits a downloading message to the terminal 10 through the paging channel. A broadcasting message generating block 41 generates a message to be transmitted to the terminal 10. A reception message generating block 42 generates a message notifying data reception. A downloading message generating block 43 generates a message to be downloaded. A message queue block 44 stores the broadcasting message, the reception message, and the downloading message. Thereafter, the message queue block 44 transmits the messages through a paging channel of a paging channel transmitting block 45, under the control of a control unit (not shown). The method for transmitting the downloading message of FIG. 4 through the paging channel will now be explained in more detail.

According to the present invention, the multi-downloading process is embodied using the paging channel because the terminals continuously monitor the paging channel in a standby mode and the paging channel is rarely influenced by the peripheral environment. In addition, a system information message generated in the base station 20 is periodically broadcasted (e.g., every 2 seconds) through the paging channel and transmitted to the terminal 10 in regard to a reception signal.

Also, the message queue method is employed to prevent the downloaded data from influencing the existing data. According to the message queue method, a module generating the reception message and the periodic broadcasting message gives priority to the downloading message. Data stored in the message queue block are sequentially transmitted by a transmission module in 20 ms units.

Figure 5:
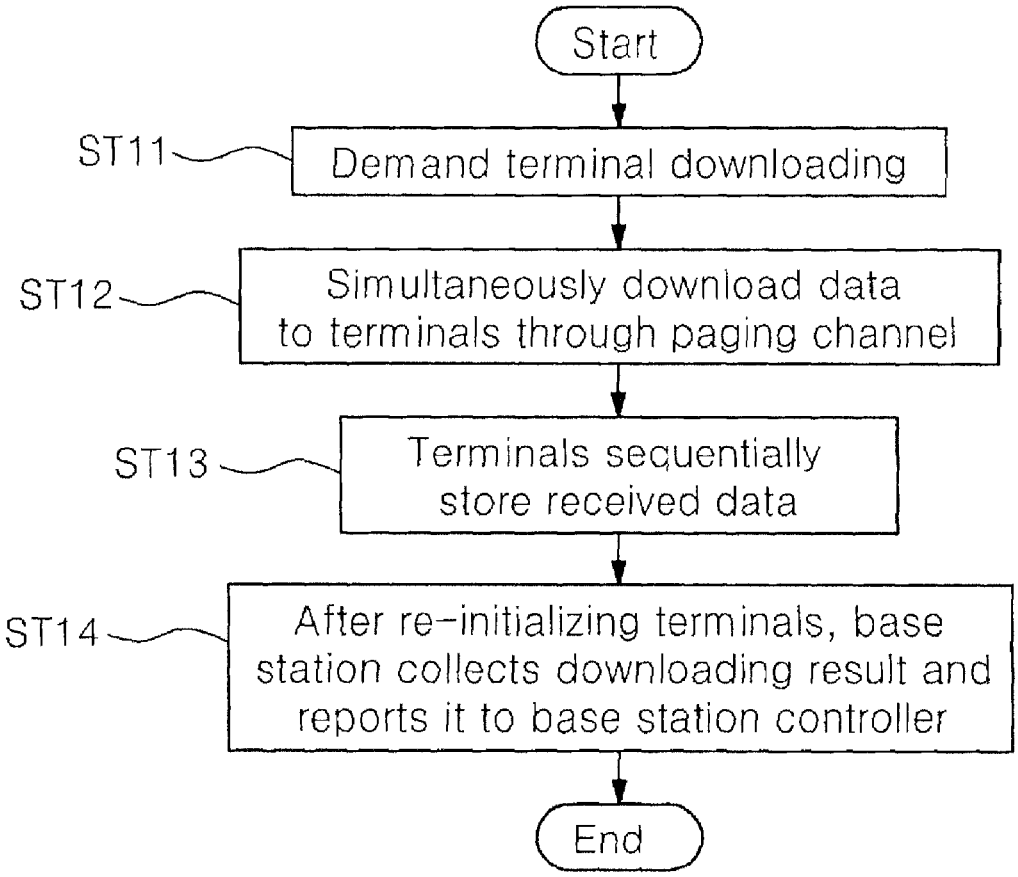
FIG. 5 illustrates a flowchart showing a method for downloading information to mobile communication terminals through the paging channel, in accordance with the preferred embodiment of the present invention.
Figure 6:
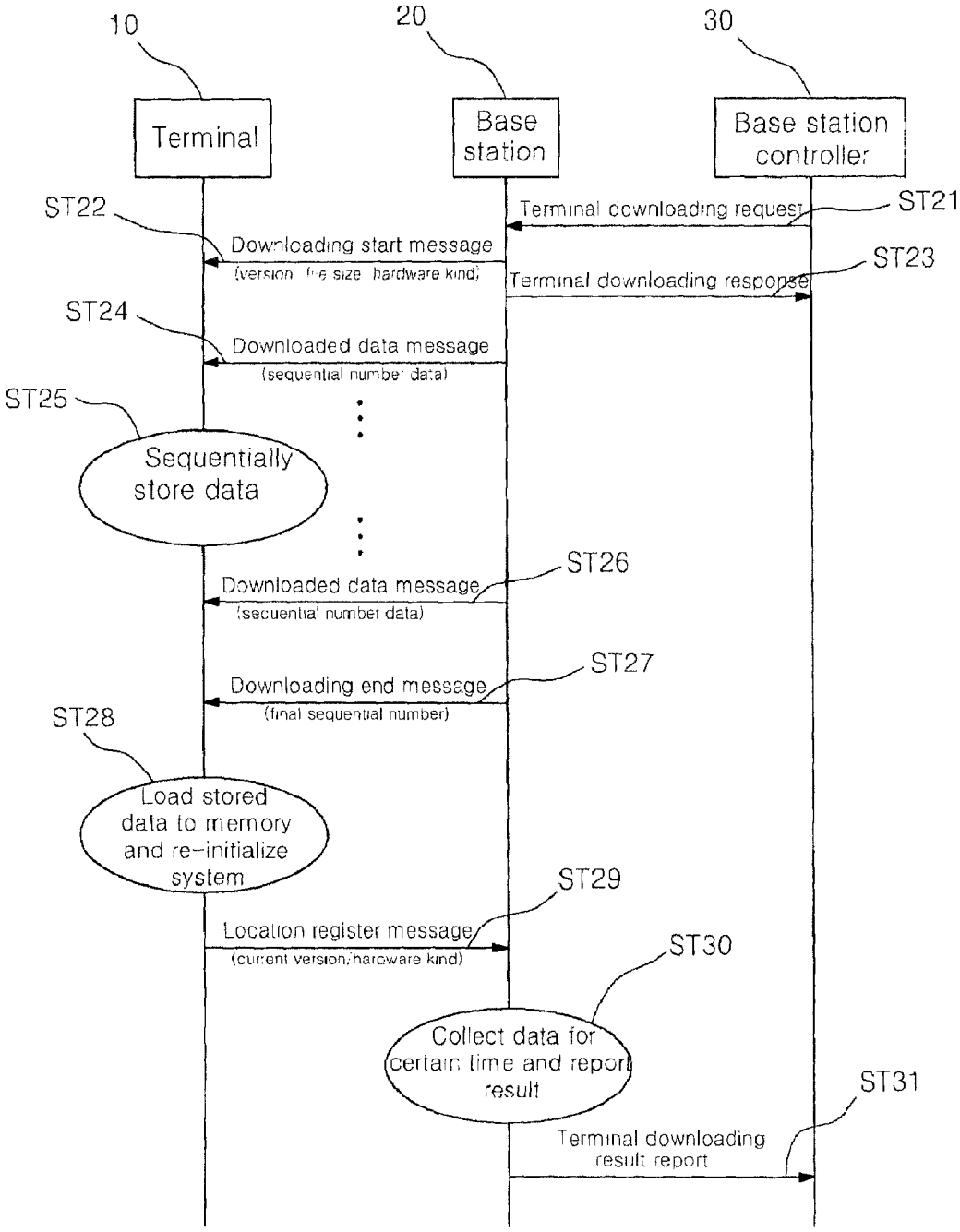
FIG. 6 illustrates a detailed signal processing procedure of FIG. 5.

FIGS. 5 and 6 illustrate the method for downloading information to the mobile communication terminals through the paging channel. The base station controller 30 sends a demand for terminal downloading to the base station 20 (ST11). The base station 20 simultaneously downloads the data to the plurality of terminals 10 through the paging channel, according to the terminal downloading request of the base station controller 30 (ST12). The plurality of terminals 10 sequentially store the received data (ST13). Then, the data stored in the terminals 10 are loaded to the memory of the terminal and the downloading result is reported to the base station controller 30 by resetting the mobile station (ST14). The above-described operation is described in more detail below in reference to FIG. 6.

When the base station controller 30 transmits the terminal downloading request to the base station 20 (ST21), the base station 20 transmits a downloading start message to the plurality of terminals 10 (ST22). The downloading start message ST22 is transmitted through the paging channel, since the terminals 10 continuously monitor the paging channel in the standby mode, and the downloading message is transmitted to each terminal according to the message queue method. The terminal 10 downloads information including a version of software, a size of a file, and a kind of the hardware. The base station 20 transmitting the downloading start message ST22 transmits a terminal downloading response signal to the base station controller 30 (ST23), to indicate the readiness of the downloading process to the terminals 10.

Next, the base station 20 transmits the downloaded data messages to the plurality of terminals 10 (ST24 and ST26) and the terminals 10 sequentially store the data messages provided by the base station 20 (ST25). If the downloaded data messages are all transmitted to the terminals 10, the base station 20 transmits a downloading end message to the terminals 10 (ST27). The terminals 10 load the stored data to memory and reset their respective systems (ST28).

On the other hand, the terminals 10 may directly store the downloaded messages in the corresponding memory and delete the existing data. Accordingly, the terminals 10 can reset the system with the data stored in the memory.

Next, the terminals 10 register a location in the base station 20 by resetting their respective systems with the new software (ST29). The base station 20 reports a data collecting result, for the downloaded software, from the terminals 10 to the base station controller 30, for a predetermined time (ST31).

The operation of the method for downloading the information from the mobile communication system to the terminals through the paging channel will now be described in more detail with reference to the accompanying drawings.

According to the present invention, the information can be simultaneously downloaded to the plurality of terminals 10 through the paging channel. The paging channel is generally a wireless control channel for paging the terminals and a forward control channel (FCC) for transmitting a command to page the terminals. Therefore, in case of generating the reception signal, the paging channel transmits a paging signal to the terminals 10 controlled by the base station 20. The terminals 10 continuously monitor the channel while in the standby mode. The system information is periodically transmitted through the channel.

First, the base station controller 30 generates a demand for the information downloading to the terminals 10. The base station controller 30 transmits the terminal downloading request to the base station 20 (ST21).

According to the terminal downloading request ST21, the base station 20 transmits the downloading start message to the plurality of terminals 10 through the paging channel (ST22). The downloading start message may include a version of a downloading file, a size of the file, and a kind of the hardware.

The base station 20 transmitting the downloading start message transmits the terminal downloading response signal to the base station controller 30 (ST23). In addition, if a downloading request to the terminal 10 exists, the base station 20 simultaneously downloads the data to the terminals 10 through the paging channel (ST24 and ST26). The terminals 10 sequentially store the received data (ST25).

That is, the base station 20 transmits the downloaded data messages to the terminals 10 (ST24 and ST26) and the terminals 10 sequentially store the downloaded data transmitted from the base station 20 (ST25). The downloaded data message may include a sequential number and data. As shown in FIG. 3, the downloading process to the terminals is performed according to the message queue method.

When the downloaded data messages are all transmitted to the plurality of terminals 10, the base station 20 transmits the downloading end message, including the final sequential number information to the terminals 10 (ST27). The terminals 10 load the stored downloaded data to the memory and reset the system (ST28). Here, the terminals 10 may directly store the downloaded data in the corresponding memory and reset the system.

Thereafter, the terminals 10 transmit a location register message to the base station 20 (ST29). The location register message includes a version of a current execute file and a kind of the hardware.

The base station 20 collects the terminal downloading result data during a predetermined time (ST30). The base station 20 reports the collected result to the base station controller 30 (ST31).

The downloading method in accordance with the present invention will now be described with respect to aspects of the base station 20 and the terminals 10.

A. Downloading Process of the Base Station

1) If the base station 20 receives the downloading command ST21 from the base station controller 30, which is an upper management system, the base station 20 downloads a corresponding file.

2) The base station 20 transmits the downloading start message ST22 through the paging channel according to the message queue method. Here, the start command includes information such as a version of the software, a kind of the hardware, and a size of a file.

3) The base station 20 transmits the downloaded data message ST24, ST26 to the terminal 10 after a predetermined time. Here, the message includes a sequential number and pure data.

4) When the base station 20 finishes data transmission, it transmits the downloading end message ST27 to the terminal 10 through the paging channel.

5) After finishing the downloading process, the base station 20 receives the downloading result and version information from the terminal 10 registering the location ST29 and transmits the information to the base station controller 30 (ST31).

B. Downloading Process of the Terminals

1) When the terminal 10 receives the downloading start message ST22, the terminal 10 confirms whether its version and hardware kind are identical to the downloaded data. If identical, the terminal 10 prepares to store the downloaded data.

2) When the downloading process is started, the terminal 10 sequentially stores the data according to the sequential number ST25. In the case that the message is lost due to a transmission or reception side error, the terminal 10 stores the data except the corresponding number.

3) When the terminal 10 receives the downloading end message ST27, the terminal 10 confirms whether the data are received by sequential order. Here, the terminal 10 requests and receives the data of the lost number.

5) After the resetting, the terminal 10 transmits the information, including the power apply location register message, the current version, and hardware kind, to the base station 20 ST29.

As discussed earlier, in accordance with the present invention, the information data are downloaded from the mobile communication system to the plurality of mobile communication terminals through the paging channel, thereby efficiently managing the widely-distributed terminals.

In addition, when the data are downloaded from the WLL to the plurality of terminals, the employed message queue method does not influence the existing data (broadcasting messages, reception messages, etc.), so that the data can be downloaded to the terminals through the paging channel. It is thus possible to efficiently manage the widely-distributed terminals.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for downloading information in a wireless system, comprising:

communicating a request for a download operation from a base station controller to a base station;

downloading the information to a plurality of mobile stations all together through a paging channel based on the request from the base station controller, and the plurality of mobile stations storing the information; and resetting the plurality of mobile stations using the stored information and reporting a downloading result from each of the plurality of mobile stations to the base station.

2. The method of claim 1, further comprising:

communicating a downloading start message to the plurality of mobile stations through the paging channel at a same time; and communicating a downloading response signal of the plurality of mobile stations to the base station controller.

3. The method of claim 2, wherein the downloading start message includes information of a version of software to be downloaded to the plurality of mobile stations, a size of a file, and a hardware type.

4. The method of claim 1, wherein the plurality of mobile stations respectively receive the information according to a software version and a hardware type contained in a downloading start message.

5. The method of claim 1, further comprising:

communicating data messages downloaded from the base station controller to the plurality of mobile stations, via the base station;

sequentially storing, within the plurality of mobile stations, the downloaded data messages from the base station;

communicating a downloading end message from the base station to the plurality of mobile stations, when the communication of the data messages is complete;

determining with at least one of the plurality of mobile stations, whether the downloaded data messages are received with a normal state; and resetting the at least one of the plurality of mobile stations, if the respective downloaded data messages are received with the normal state.

6. The method of claim 5, wherein each of the plurality of mobile stations stores the downloaded data messages in a different memory position of the respective mobile station then that used to store an existing software of the respective mobile station and the base station resets each of the plurality of mobile stations using the stored data messages when the downloaded data messages are received at each of the respective mobile stations with the normal state.

7. The method of claim 5, wherein the base station resets the at least one of the mobile stations using the downloaded data messages when the downloaded data messages are received at the at least one of the mobile stations with the normal state.

8. The method of claim 5, wherein the data messages are stored sequentially with associated sequential numbers, except a data message received with an error is stored without the associated sequential number.

9. The method of claim 8, wherein the data message received with the error is identified by the corresponding one of the associated sequential numbers as being received with an abnormal state and is downloaded again.

10. The method of claim 5, wherein when the downloaded data messages are all transmitted to the plurality of mobile stations, the base station transmits the downloading end message, including a final sequential number, to the plurality of mobile stations.

11. The method of claim 1, further comprising:

communicating a location register message from the at least one of the mobile stations to the base station after resetting the at least one of the mobile stations;

determining the downloading result during a predetermined time based on the location register message from the at least one of the mobile stations; and reporting the downloading result to the base station controller.

12. The method of claim 11, wherein the location register message includes a version of a current software and a hardware type.

13. The method of claim 1, wherein the information transmitted from the base station to the plurality of mobile stations is transmitted through the paging channel, according to a message queuing method.

14. The method of claim 5, wherein the data messages transmitted from the base station to the plurality of mobile stations are transmitted through the paging channel, according to a message queuing method.

15. A method of communicating information, comprising:

communicating data messages from a common terminal to distributed terminals all together;

storing the data messages in each of the distributed terminals; and resetting an operation of the distributed terminals based on the stored data messages, wherein the common terminal communicates each of the data messages to all of the distributed terminals all together through a paging channel.

16. The method of claim 15, further comprising:

identifying each of the data messages by a sequential number contained within the respective data messages; and storing the corresponding sequential number with each of the stored data messages.

17. The method of claim 15, further comprising:

identifying each of the data messages by a sequential number contained within the respective data message;

storing, within each of the respective distributed terminals, the corresponding sequential number with each of the stored data messages that is received without an error; and identifying, with each of the respective distributed terminals, each of the data messages received with an error based on the stored sequential numbers, wherein each of the sequential numbers omitted from storage identifies a corresponding one of the data messages received by the respective distributed terminal with an error.

18. The method of claim 17, further comprising:

communicating, with each of the distributed terminals, each of the identified data messages received with an error to the common terminal; and communicating each of the identified data messages received with an error from each of the respective distributed terminals to a system controller.

19. The method of claim 18, further comprising:

communicating the identified data messages, received by the respective distributed terminals with an error, to the respective distributed terminals again.

20. The method of claim 17, wherein:

the common terminal collects the identified data messages from the distributed terminals for a predetermined period of time.

21. The method of claim 15, further comprising:

communicating a request from a system controller to the common terminal to download a file to the distributed terminals;

communicating a download start message from the common terminal to the distributed terminals; and communicating a download response message from the common terminal to the system controller indicating a status of a download operation, wherein the download start message includes an identification of a file version, a file size, and a hardware type.

22. The method of claim 15, wherein:

the data messages are queued by the common terminal with broadcast messages and reception messages for communication to the distributed terminals; and the queued messages are communicated in their respective order of arrival to a queue of the common terminal.

*23. A method of downloading information comprising:*

*monitoring a paging channel while a terminal is in a standby mode;*

*receiving a download start message through the paging channel while the terminal is monitoring the paging channel, wherein the download start message is transmitted to a plurality of terminals;*

*receiving information at the terminal, wherein the received information relates to new terminal software;*

*storing the received information in a terminal memory;*

*resetting the terminal based on the stored information that relates to the new terminal software; and*

*reporting a downloading result from the terminal having the new terminal software.*

*24. The method of claim 23, wherein the download start message includes information of a version of a download file.*

*25. The method of claim 23, wherein the download start message includes information of a size of a file or a kind of hardware.*

*26. The method of claim 23, wherein the downloading result includes information of a current software version of the terminal.*

*27. The method of claim 23, wherein the received information includes a sequential number.*

*28. The method of claim 27, wherein storing the received information includes storing the received information based on the sequential number.*

*29. The method of claim 23, wherein reporting the downloading result includes the terminal sending a message following the resetting of the terminal.*

*30. The method of claim 23, wherein receiving the information includes receiving a download end message.*

* * * * *